United States Patent Office 3,308,115
Patented Mar. 7, 1967

3,308,115
METAL-CONTAINING REACTIVE MONOAZO DYESTUFFS
Jakob Benz, Oberwil, Basel-Land, and Hanspeter Uehlinger, Basel, Switzerland, assignors to Sandoz Ltd. (also known as Sandoz A.G.), Basel, Switzerland
No Drawing. Filed July 1, 1963, Ser. No. 292,157
Claims priority, application Switzerland, Apr. 10, 1959, 71,848/59
6 Claims. (Cl. 260—151)

This application is a continuation-in-part of our application Ser. No. 20,845, filed April 8, 1960, and now abandoned, and relates to the 1:2-chromium and 1:2-cobalt complex compounds of the monoazo dyestuffs of the formula

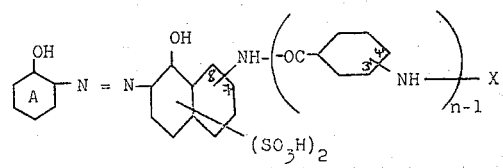

wherein

X represents acrylyl, halogenacetyl, $\beta$-halogenopropionyl, $\alpha.\beta$-dihalogenopropionyl or $\alpha$-halogenacrylyl, halogen having an atomic number from 17 to 35, inclusive, i.e. being chlorine or bromine, $n$ represents one of the integers 1 and 2, the nucleus A may bear any desired substituents except sulfonic acid groups, the group

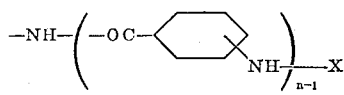

stands in one of the positions 7 and 8 of the naphthalene nucleus and the group —NH— stands in one of the positions 3' and 4'.

A series of particularly interesting dyestuffs comprises the 1:2-chromium and 1:2-cobalt complex compounds of the dyestuffs of the formula

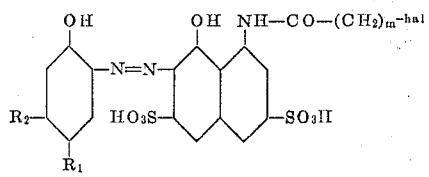

wherein hal is a halogen atom with an atomic number from 17 to 35, inclusive, i.e. is chlorine or bromine, $R_1$ is chlorine or nitro, $R_2$ is hydrogen, chlorine or nitro and is different from $R_1$, and $m$ is one of the integers 1 and 2.

The process for the production of the new chromium- or cobalt-containing reactive dyestuffs consists in re-acting with each other—1 mole of the diazo compound of a 2-amino-1-hydroxybenzene which may contain any desired substituents except sulfonic acid groups—1 mole of a coupling component of the formula

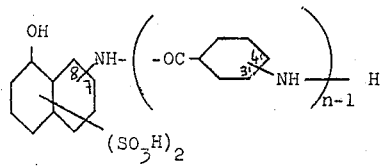

wherein $n$ possesses the afore-cited meaning, and H represents an exchangeable hydrogen atom, and 1 mole of a functional derivative of acrylic acid, halogenacetic acid, $\beta$-halogenopropionic acid, $\alpha.\beta$-dihalogenopropionic acid or $\alpha$-halogenoacrylic acid, the reaction being conducted in such a manner that the diazo compound is introduced into the position ortho to —OH of the coupling component and the radical X replaces the hydrogen atom H of the coupling component; during or after the formation of the dyestuffs they are treated with a chromium- or cobalt-yielding agent.

A suitable procedure is as follows: 1 mole of a monoazo dyestuff of the formula

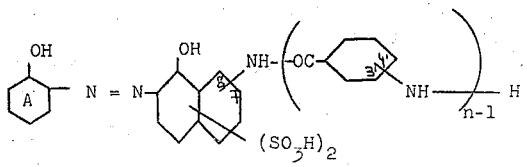

wherein A, H and $n$ have the afore-cited meanings, 1 mole of a functional derivative of acrylic acid, halogenacetic acid, $\beta$-halogenopropionic acid, $\alpha.\beta$-dihalogenopropionic acid or $\alpha$-halogenoacrylic acid, and a chromium- or cobalt-yielding agent are reacted with each other so that the functional derivative or acrylic acid, halogenoacetic acid, $\beta$-halogenopropionic acid, $\alpha.\beta$-dihalogenopropionic acid or $\alpha$-halogenoacrylic acid reacts with the exchangeable hydrogen atom of the monoazo dyestuffs (III) and the chromium- or cobalt-yielding agent reacts with the ortho-ortho'-dihydroxyazo grouping.

A modification of this procedure consists in coupling in ortho-position to the hydroxy group 1 mole of the diazo compound of an amine of the formula

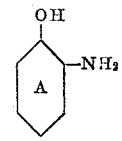

(IV)

wherein A possesses the above-named meaning, with 1 mole of a coupling component of the formula

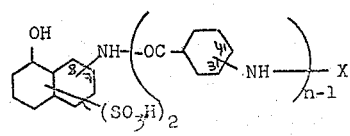

wherein $n$ and X possess the above-named meanings, and treating the resulting monoazo dyestuff with a chromium- or cobalt-yielding agent.

The metal-containing reactive dyestuffs obtained by both procedures are the 1:2-chromium or 1:2-cobalt complex compounds of the monoazo dyestuffs of Formula I. The substituents which, in accordance with the definition, may be contained in the nucleus A are halogen (chlorine, bromine) atoms, lower alkyl or alkoxy groups (methyl, ethyl, methoxy, ethoxy), nitro groups, acylamino (acetyl-, propionyl-, benzoyl-, carbomethoxy-, carbethoxy- amino) groups, alkylsulfonyl (methylsulfonyl) and sulfonic acid amide groups which may be substituted on the nitrogen atom (amide, methylamide, ethylamide, dimethylamide, diethylamide, 2-hydroxyethylamide, di-(2'-hydroxyethyl)-amide, 2- or 3-hydroxypropylamide, 3-methoxypropylamide, 3- or 4-methoxybutylamide, 2-ethoxyethylamide, phenylamide, 2-, 3- or 4-methyl-, -methoxy-, -ethoxy- or -chlorophenylamide, N-methyl-N-phenylamide, N-2-hydroxy-ethyl-N-phenylamide, benzylamide cyclohexylamide).

The coupling components used as starting materials are the 1-amino-8-hydroxynaphthalene-2.4-, -3.6- and -4.6-disulfonic acids, 2-amino-8-hydroxynaphthalene- 3.6-disulfonic acid, and the derivatives of these acids in which the amino group is acylated by an aminobenzoyl radical.

The radical X can be the bromacetyl, β-bromopropionyl, α.β-dibromopropionyl or α-bromacrylyl radical or preferably the acrylyl, α-chloracrylyl, chloracetyl, β-chloropropionyl or α.β-dichloropropionyl radical.

The reaction of the monoazo dyestuffs of Formula III or their 1:2-chromium- or 1:2-cobalt-complex compounds with a functional derivative of an acid of the group consisting of halogenoacetic acid, β-halogenopropionic acid, α.β-dihalogenopropionic acid, acrylic acid and α-halogeno-acrylic acid is carried out preferably with the acid chlorides of the said acids in aqueous medium, preferably with good cooling, and in presence of an acid-binding agent such as sodium carbonate, sodium hydroxide, barium hydroxide, calcium hydroxide or sodium acetate.

For acylation, the carboxylic acid chloride may be employed as such or in solution in two to five times its amount of benzene, chlorobenzene, methylbenzene, dimethylbenzene or acetone, and it is added dropwise to the aqueous solution of the substance containing the amino group at 0–30° C., but preferably at 2–5° C., in presence of an acid-binding agent and preferably at a pH value of 7 to 3.

The coupling of the diazo compound of an amine of amine of the Formula IV with a coupling component of the Formula V is carried out in alkaline medium, preferably at temperatures of 0–20° C.

The monoazo dyestuffs are converted into their 1:2-chromium or 1:2-cobalt complex compounds preferably in aqueous solution or in an organic medium, e.g. formamide, or in the concentrated aqueous solution of an alkali metal salt of a low molecular aliphatic monocarboxylic acid. It is of advantage to proportion the reactants so that an amount of metal-yielding agent containing less than two but at least one atom of metal acts upon two molecules of the monoazo dyestuff.

Suitable chromium compounds are, e.g., chromic fluoride, chromic sulfate, chromic formate, chromic acetate, chromic potassium sulfate or chromic ammonium sulfate. The chromates, e.g. sodium or potassium chromate or bichromate, are also eminently suitable for metallizing the monoazo dyestuffs. It is advantageous to work here in a strongly caustic alkaline medium, to which reducing substances may be added if desired.

Colbaltous formate, cobaltous acetate and cobaltous sulfate are examples of suitable cobalt compounds. If metallization is effected in the concentrated aqueous solution of an alkali metal salt of a low molecular aliphatic monocarboxylic acid, water-insoluble metal compounds can be used, e.g. cobalt hydroxide or cobalt carbonate.

It is especially advantageous to carry out metallization in aqueous or alkaline medium to which the metal compounds are added in presence of compounds which maintain the metal dissolved in complex combination in caustic alkaline medium; examples of such compounds are tartaric acid, citric acid and lactic acid.

The metal complex compounds obtained are precipitated from aqueous medium by the addition of salt, if desired after running the organic metallizing solution into brine, and are subsequently filtered off, washed if necessary and dried.

The metal-containing azo dyestuffs thus obtained are homogeneous metal complex compounds in which essentially one atom of metal is linked to two molecules of the monoazo compound. The metal complex compounds are so-called 1:2 complexes in which one molecule of the monoazo compound is linked with approximately 0.3 to 0.7 atom of metal.

The dyestuffs of the invention possess good solubility in water, good stability in printing pastes and padding liquors, good compatibility to salts and hard water; they are practically insensitive to heavy metals such as iron, copper or chromium and reserve cellulose-2½- and -triacetate, polyester fibers such as polyethylene terephthalate, polyvinyl chloride and polyvinyl acetate fibers, pure polyacrylonitrile fibers and polyalkylene fibers such as poly-ethylene and polypropylene fibers.

They possess a very good reactivity with vegetable fibers, e.g. cotton and linen, regenerated cellulose, e.g. viscose filament fibers, viscose staple fibers, cuprammonium rayon; animal fibers such as wool and silk and synthetic polyamide fibers such as nylon 6,6, nylon 6 and nylon 11. Therefore they are suitable for dyeing leather, for dyeing, padding or printing wool, silk, synthetic polyamide fibers, and fibers of natural and regenerated cellulose and mixtures of these fibers in violet, dark blue and black shades. The commonly used padding and printing techniques can be applied, e.g. the padding processes: pad jig, pad steam, pad roll, pad batch and thermofixation process, and the printing processes named roller printing, screen printing, emulsion printing and Vigoureux printing; in these printing processes the dyestuffs are fixed on the substrate by steaming or thermofixation.

The optimum conditions of application of the dyestuffs vary widely depending on the type of fiber to be dyed. In the case of animal fibers and synthetic polyamide fibers it is preferable to dye, pad or print, or alternatively to fix, in a weakly acid, neutral or weakly alkaline medium, e.g. in presence of acetic acid, formic acid, ammonium sulfate, sodium acetate, sodium bicarbonate, sodium or potassium carbonate, sodium meta-phosphate, etc. Dyeing can also be carried out in an acetic acid to neutral bath in presence of leveling agents, e.g. polyoxethylated fatty amines or mixtures of the same with alkylpolyglycol ethers, the dyebath being adjusted on completion of dyeing to a neutral or weakly alkaline reaction, using for this purpose small amounts of an agent of alkaline reaction, e.g. ammonia, sodium bicarbonate, carbonate or hydroxide, etc., or compounds which react alkaline on heating, e.g. hexamethylenetetramine or urea. The dyed goods are then thoroughly washed and if necessary acidified with a little acetic acid.

The dyeings and prints on wool, silk and synthetic polyamide fibers possess good fastness to light, washing, water, sea water, milling, acid and alkaline perspiration, crocking, chlorinated swimming pool water, hypochlorites, peroxides, ironing, acids (dilute acetic acid, dilute tartaric acid in the cold), alkali (sodium bicarbonate, sodium carbonate), gas fumes and organic solvents.

Cellulosic fibers are dyed, padded and printed preferably from alkaline media, e.g. in presence of sodium bicarbonate, sodium carbonate, sodium hydroxide, potassium hydroxide, calcium hydroxide, sodium metasilicate, sodium borate, water glass, trisodium phosphate, ammonia, trimethylamine, quaternary bases, e.g. tetraalkylammonium compounds, etc. To prevent reduction reactions during dyeing, padding or printing, it is often advantageous to use a mild oxidizing agent, e.g. sodium 1-nitrobenzene-3-sulfonate. Dyeings on cellulosic fibers are normally fixed by treatment in heat. Provided sufficiently strong alkalis such as sodium or potassium hydroxide, sodium metasilicate or trisodium phosphate are used, a number of the dyestuffs can be applied by cold dyeing methods.

In dyeing, padding and printing applications the dyestuffs can be fixed simultaneously or subsequently, in the same or in a fresh bath, if necessary after intermediate drying. When fixation is carried out in a fresh bath it is advisable to include in it a water-soluble salt, e.g. sodium sulfate, to preclude a partial redissolving of the dyestuff in the liquor. After fixation the portion of unreacted dyestuff, i.e. the dyestuff which has not taken part in the chemical reaction with the fiber, must be removed from the dyed or printed material. Owing to the very slight substantivity and the good solubility in water of the new dyestuffs this removal is in general easy and can often be carried out by rinsing with hot water, whereby in case of prints no staining of the unprinted areas appears. Washing at higher temperatures with solutions of soap or of synthetic detergents, e.g. alkylarylsulfonates such as sodium dodecylbenzenesulfonate, alkyl sulfates such as sodium dodecyl, oleyl or cetyl sulfate, optionally sulfated or carboxymethylated alkylpolyglycol, mono- or dialkylphenylpolyglycol ethers, although it is seldom necessary, is nevertheless generally employed in routine padding and printing processes in order to obtain perfect prints and dyeings.

The dyeings and prints on cellulosic fibers possess good fastness to light, gas fumes and hypochlorites, and excellent fastness to water, sea water, washing, acid and alkaline perspiration, crocking, ironing and organic solvents (alkohols, ketones, esters, aromatic and aliphatic hydrocarbons which may be halogenated, pyridine and 1:1-pyridine-water-mixture, dimethylformamide, dimethylsulfoxide, etc.), these excellent fastness properties being due to the stable chemical linkage formed between the dyestuff molecule and the cellulose molecule. In addition the dyeings and prints are also very fast to acids (cold dilute acetic and tartaric acid) alkali (sodium bicarbonate and carbonate), peroxides and chlorinated swimming pool water and are very suitable for anticrease finishing treatments (i.e. the anticrease finishing treatment does not affect the fastness to light).

In the following examples the parts and percentages are by weight and the temperatures in degrees centigrade.

Example 1

51.8 parts of the dyestuff (as disodium salt) from diazotized 2-amino-1-hydroxy-4-chlorobenzene and 1-amino-8-hydroxynaphthalene-3.6-disulfonic acid are stirred into 300 parts of water. At 80° 30 parts of crystallized sodium acetate and 30 parts of crystallized chromic potassium sulfate are added and the mixture is heated for 24 hours with reflux. After cooling to 90° the dyestuff is precipitated by the addition of 70 parts of sodium chloride and filtered off at 20°. The dyestuff paste is dissolved in 300 parts of water and cooled to about 0°. To the solution, externally cooled with ice, is added dropwise in the course of about 20 minutes a solution of 19 parts of β-chloro-propionic acid chloride in 20 parts of acetone. During this time the pH-value is maintained at 6–7 by dropping in a 20% sodium carbonate solution. The reaction product is salted out, filtered off, washed with a sodium chloride solution, dried and ground. It is a black powder which dissolves in water to give dark blue solutions.

Example 2

52.8 parts of the dyestuff (as disodium salt) obtained by coupling diazotized 2-amino-1-hydroxy-4-nitrobenzene with 1-amino-8-hydroxynaphthalene-3.6-disulfonic acid in alkaline medium are stirred into 600 parts of water. The dyestuff suspension is adjusted to a pH-value of 7 and cooled to 0–5°. To the well stirred suspension maintained at 0–5° by external cooling 17 parts of chloracetic acid chloride are added dropwise in about 20 minutes. During this time the pH-value is held at 6–7 by dropping in a 20% sodium carbonate solution. When condensation is completed, the dyestuff suspension is heated to 75° and a solution of 15 parts of cobaltous sulfate heptahydrate in 40 parts of water is added dropwise in the course of 30 minutes. At the same time a dilute sodium carbonate solution is dropped in to maintain the pH-value of the reaction mass at about 6. The mass is further stirred at 75° until the metallization is completed, i.e. until all the dyestuff is gone into solution. By slow addition of sodium chloride at 80° the dyestuff is precipitated; it is then filtered off at 20–25°, dried and ground to give a black powder which dissolves in water with a black coloration.

Example a

A mercerized cotton fabric is impregnated on a pad with a solution of:

8 parts of the dyestuff of Example 1
20 parts of urea
2 parts of sodium carbonate and
100 parts of water, passed between squeeze rollers to give an increase of about 70% on its dry weight and then dried. The dyeing is fixed by treatment in dry heat for 4–5 minutes at 140–150° or by steaming for 10 minutes at 102–104°, rinsed cold and warm, soaped at the boil for 15 minutes with a 0.2% solution of a non-ionic detergent, and finally rinsed and dried. A navy blue shade fast to wet treatments is obtained.

Example b

For the printing of mercerized cotton or cotton cretonne a paste of the following composition is employed:

50 parts of dyestuff of Example 1
100 parts of urea
15 parts of sodium carbonate
10 parts of sodium 3-nitrobenzene-1-sulfonate
450 parts of 3% sodium alginate thickening
375 parts of water 1000 parts total The print is dried at 50°, fixed by steaming for 10 minutes at 102–104° or by treatment in dry heat for 5 minutes at 140–150°, washed for 5 minutes in cold water at a goods-to-liquor ratio of 1:40, then put into a new cold water bath (goods-to-liquor ratio 1:40) which is heated to 100° in the course of 5 minutes and held at 100° for 5 minutes. The washed print is withdrawn, rinsed with running tap water and dried. The navy blue print is fast to light and to wet treatments and the unprinted area is perfectly white.

Example c

A dyebath is set with 5000 parts of water, 3 parts of the dyestuff of Example 2, 3 parts of glacial acetic acid, 0.8 part of an oxethylated fatty amine and 0.5 part of an oleylpolyglycol ether. 100 parts of a wool fabric are entered at 50°, the dyebath brought to the boil in 30 minutes and dyeing continued at the boil for 45 minutes. The dyed fabric is removed, rinsed with water and dried. It is dyed in a reddish black shade of very good fastness to light, washing, milling and perspiration.

On completion of dyeing the dyebath may be neutralized with ammonia and the goods treated in it for 20 minutes at 90° in order to obtain somewhat better wet fastness. The same effect can be obtained by aftertreatment of the dyed goods in a fresh bath of 5000 parts of water and 3 parts of hexamethylenetetramine for 20–30 minutes at 90–95°.

Example d

For the Vigoureux printing of wool a paste of the following composition is used:

60 parts of the dyestuff of Example 2
200 parts of urea
200 parts of 3% sodium alignate thickening
3 parts of a highly sulfonated castor oil
537 parts of water 1000 parts total The printed slubbing is steamed for two 45-minute periods with intermediate cooling, rinsed with hot and cold water and dried. The obtained reddish black print is fast to light and to wet treatments.

The following table gives details of further chromium- or cobalt-containing reactive dyestuffs produced according to Examples 1 or 2. In the table they are characterized by the diazo and coupling components (columns I and II), by the radical X (column III), by the metal used for metal complex formation (column IV), by the method of production (column V) and by the shade of the dyeings or prints on cotton (c) or wool (w) in column VI.

TABLE

| Ex. No. | Diazo Component (I) | Coupling Component (II) | Radical X (III) | Metal (IV) | Method of Preparation Example (V) | Shade on cotton (c) or wool (w) (VI) |
|---|---|---|---|---|---|---|
| 3 | 2-amino-1-hydroxy-4-chlorobenzene. | 1-amino-8-hydroxy-naphthalene-3.6-disulfonic acid. | β-Chloropropionyl | Co | 1 | Reddish blue (c). |
| 4 | ...do... | ...do... | Chloracetyl | Co | 1 | Reddish blue (w). |
| 5 | ...do... | ...do... | Acrylyl | Cr | 1 | Blue (c). |
| 6 | ...do... | ...do... | α-Chloracrylyl | Cr | 1 | Blue (w). |
| 7 | 2-amino-1-hydroxy-4-chloro-5-nitrobenzene. | ...do... | β-Chloropropionyl | Cr | 1 | Navy blue (c). |
|  |  |  |  | Co | 1 | Do. |
| 8 | ...do... | ...do... | α,β-dichloropropionyl | Cr | 1 | Navy blue (w). |
| 9 | 2-amino-1-hydroxy-benzene-4-sulfonic acid-(3'-methoxy)-propylamide. | ...do... | Chloracetyl | Cr | 1 | Blue (w). |
| 10 | 2-amino-1-hydroxy-benzene-4-sulfonic acid-(2'-hydroxy)-ethylamide. | ...do... | Bromacetyl | Cr | 1 | Do. |
| 11 | ...do... | ...do... | β-Bromopropionyl | Co | 1 | Reddish blue (c). |
| 12 | ...do... | 1-amino-8-hydroxy-naphthalene-4.6-disulfonic acid. | β-Chloropropionyl | Cr | 1 | Blue (w). |
|  |  |  |  | Co | 1 | Reddish blue (c). |
| 13 | 2-amino-1-hydroxy-4-nitrobenzene. | ...do... | ...do... | Co | 2 | Violet (w). |
|  |  |  |  | Cr | 1 | Blue (c). |
| 14 | ...do... | ...do... | Acrylyl | Cr | 2 | Blue (w). |
| 15 | 2-amino-1-hydroxy-4-chloro-5-nitrobenzene. | 1-amino-8-hydroxynaphthalene-3.6-disulfonic acid. | Chloracetyl | Co | 1 | Navy blue (w). |
| 16 | 2-amino-1-hydroxy-4-nitrobenzene. | ...do... | β-Chloropropionyl | Co | 1 | Reddish black (w). |
|  |  |  |  | Cr | 1 | Greenish black (w). |
| 17 | ...do... | ...do... | α-Chloracrylyl | Cr | 1 | Do. |
| 18 | ...do... | ...do... | Acrylyl | Co | 2 | Reddish black (c). |
| 19 | 2-amino-1-hydroxy-4-chloro-6-nitrobenzene. | ...do... | ...do... | Co | 1 | Reddish navy blue (w). |
|  |  |  |  | Cr | 1 | Navy blue (c). |
| 20 | 2-amino-1-hydroxy-4.6-dinitrobenzene. | ...do... | β-Chloropropionyl | Co | 1 | Greenish black (c). |
|  |  |  |  | Cr | 1 | Bluish black (c). |
| 21 | 2-amino-1-hydroxy-6-nitrobenzene-4-sulfonic acid amide. | ...do... | ...do... | Cr | 1 | Navy blue (w). |
| 22 | 2-amino-1-hydroxy-benzene-4-sulfonic acid amide. | ...do... | α,β-Dibromopropionyl | Cr | 1 | Do. |
| 23 | ...do... | ...do... | α-Bromacrylyl | Cr | 1 | Do. |
| 24 | ...do... | ...do... | β-Chloropropionyl | Cr | 1 | Navy blue (c). |
|  |  |  |  | Co | 1 | Reddish navy blue (c). |
| 25 | ...do... | ...do... | Chloracetyl | Co | 1 | Reddish navy blue (w). |
| 26 | ...do... | 1-(3'-amino)-benzoyl-amino-8-hydroxynaphthalene-3.6-disulfonic acid. | ...do... | Cr | 1 | Navy blue (w). |
| 27 | 2-amino-1-hydroxy-4-chlorobenzene. | ...do... | β-Chloropropionyl | Co | 2 | Reddish navy blue (c). |
| 28 | 2-amino-1-hydroxybenzene-4-sulfonic acid methylamide. | 1-amino-8-hydroxynaphthalene-3.6-disulfonic acid. | β-Bromopropionyl | Cr | 1 | Navy blue (c). |
| 29 | ...do... | 2-amino-8-hydroxynaphthalene-3.6-disulfonic acid. | β-Chloropropionyl | Co | 2 | Reddish navy blue (c). |
| 30 | 2-amino-1-hydroxy-4-chlorobenzene. | ...do... | ...do... | Co | 1 | Violet (c). |
|  |  |  |  | Cr | 1 | Do. |
| 31 | 2-amino-1-hydroxy-4-nitrobenzene. | ...do... | ...do... | Cr | 1 | Gray (c). |
|  |  |  |  | Co | 1 | Brownish violet (c). |
| 32 | ...do... | ...do... | Chloracetyl | Cr | 1 | Gray (w). |
| 33 | 2-amino-1-hydroxy-4-chloro-5-nitrobenzene. | ...do... | α-Chloracrylyl | Cr | 1 | Bluish gray (w). |
| 34 | ...do... | 1-(4'-amino)-benzoylamino-8-hydroxynaphthalene-3.6-disulfonic acid. | ...do... | Cr | 1 | Blue (w). |
| 35 | 2-amino-1-hydroxy-4-nitro-6-chlorobenzene. | ...do... | β-Chloropropionyl | Cr | 1 | Blue (c). Blue (w). |
| 36 | 2-amino-1-hydroxybenzene-4-sulfonic acid phenylamide. | 1-amino-8-hydroxynaphthalene-3.6-disulfonic acid. | ...do... | Cr | 1 | Blue (c). |
|  |  |  |  | Co | 1 | Reddish blue (c). |
| 37 | 2-amino-1-hydroxy-4-bromobenzene. | ...do... | ...do... | Cr | 1 | Blue (c). |
| 38 | 2-amino-1-hydroxy-4-methylbenzene. | ...do... | ...do... | Co | 1 | Reddish blue (c). |
| 39 | 2-amino-1-hydroxy-6-acetyl-amino-4-nitrobenzene. | 1-amino-8-hydroxynaphthalene-3.6-disulfonic acid. | Chloracetyl | Cr | 1 | Greenish black (w). |
|  |  |  |  | Co | 1 | Reddish black (w). |
| 40 | 2-amino-1-hydroxy-4-methoxybenzene. | ...do... | β-Chloropropionyl | Cr | 1 | Reddish blue (c). |
| 41 | 2-amino-1-hydroxy-4-methylsulfonylbenzene. | ...do... | ...do... | Cr | 1 | Blue (c). |
|  |  |  |  | Co | 1 | Reddish blue (c). |
| 42 | 2-amino-1-hydroxy-3.4.6-trichlorobenzene. | ...do... | ...do... | Cr | 1 | Navy blue (w). |
| 43 | 2-amino-1-hydroxy-4-nitrobenzene. | 1-(3'-amino)-benzoylamino-8-hydroxynaphthalene-4.6-disulfonic acid. | ...do... | Cr | 1 | Greenish black (c). |
| 44 | 2-amino-1-hydroxybenzene-4-sulfonic acid-(4'-methoxy)-butylamide. | ...do... | Bromacetyl | Cr | 1 | Blue (w). |
| 45 | 2-amino-1-hydroxybenzene-4-sulfonic acid-(2'-ethoxy)-ethylamide. | 1-amino-8-hydroxynaphthalene-4.6-disulfonic acid. | α-Chloracrylyl | Cr | 1 | Do. |
| 46 | 2-amino-1-hydroxy-4-chloro-6-carbomethoxyaminobenzene. | ...do... | β-Chloropropionyl | Co | 1 | Reddish blue (c). |
| 47 | 2-amino-1-hydroxybenzene-4-sulfonic acid-n-propylamide. | ...do... | Acrylyl | Cr | 2 | Blue (c). |

TABLE—Continued

| Ex. No. | Diazo Component (I) | Coupling Component (II) | Radical X (III) | Metal (IV) | Method of Preparation Example (V) | Shade on cotton (c) or wool (w) (VI) |
|---|---|---|---|---|---|---|
| 48 | 2-amino-1-hydroxybenzene-4-sulfonic acid-di-(3'-hydroxypropylamide). | 1-(4'-amino)-benzoylamino-8-hydroxynaphthalene-3.6-disulfonic acid. | β-chloropropionyl | Cr | 1 | Navy blue (c). |
| 49 | 2-amino-1-hydroxybenzene-4-sulfonic acid-(3'-sulfamyl)-phenylamide. | ...do... | Chloracetyl | Cr | 1 | Navy blue (w). |
| 50 | 2-amino-1-hydroxy-4-chlorobenzene. | 1-amino-8-hydroxynapthalene-2.4-disulfonic acid. | β-Chloropropionyl | Cr | 1 | Blue (c). |
| 51 | 2-amino-1-hydroxybenzene-4-sulfonic acid ethylamide. | ...do... | ...do... | Cr | 1 | Do. |
| 52 | 2-amino-1-hydroxy-4-nitrobenzene. | 1-(4'-amino)-benzoylamino-8-hydroxynaphthalene-4.6-disulfonic acid. | ...do... | Cr | 1 | Greenish black (c). |
|  |  |  |  | Co | 1 | Reddish black (c). |
| 53 | 2-amino-1-hydroxybenzene-4-sulfonic acid-di-(2'-hydroxyethyl)-amide. | ...do... | ...do... | Cr | 1 | Blue (c). |
| 54 | 2-amino-1-hydroxybenzene-4-sulfonic acid-(4'-methyl)-cyclohexylamide. | ...do... | ...do... | Cr | 1 | Do. |
| 55 | 2-amino-1-hydroxy-4-ethoxybenzene. | 1-amino-8-hydroxynaphthalene-4.6-disulfonic acid. | ...do... | Cr | 1 | Reddish blue (c). |
| 56 | 2-amino-1-hydroxy-4-nitro-6-carbethoxyaminobenzene. | 1-amino-8-hydroxy-naphthalene-3.6-disulfonic acid. | Acrylyl | Cr | 2 | Blue (w). |
| 57 | 2-amino-1-hydroxybenzene-4-sulfonic acid-(2'-carboxy)-phenylamide. | ...do... | ...do... | Cr | 1 | Blue (c). |
| 58 | 2-amino-1-hydroxy-4-nitro-6-benzoylaminobenzene. | ...do... | Chloracetyl | Cr | 1 | Reddish black (w). |
| 59 | 2-amino-1-hydroxy-4-nitro-6-propionylaminobenzene. | ...do... | β-Chloropropionyl | Cr | 1 | Greenish black (c). |
| 60 | 2-amino-1-hydroxybenzene-4-sulfonic acid-N-methyl-N-phenylamide. | 2-amino-8-hydroxynaphthalene-3.6-disulfonic acid. | α-Chloroacrylyl | Cr | 1 | Blue (w). |
| 61 | 2-amino-1-hydroxybenzene-4-sulfonic acid diethylamide. | 1-amino-8-hydroxynaphthalene-3.6-disulfonic acid. | Bromacetyl | Co | 1 | Reddish blue (w) |
| 62 | 2-amino-1-hydroxybenzene-4-sulfonic acid cyclohexylamide. | ...do... | β-Bromopropionyl | Cr | 1 | Blue (c). |
| 63 | 2-amino-1-hydroxybenzene-4-sulfonic acid-(4'-methyl)-phenylamide. | ...do... | β-Chloropropionyl | Cr | 1 | Do. |
| 64 | 2-amino-1-hydroxybenzene-4-sulfonic acid benzylamide. | ...do... | ...do... | Cr | 1 | Do. |
| 65 | 2-amino-1-hydroxybenzene-4-sulfonic acid dimethylamide. | 1-amino-8-hydroxynaphthalene-3.6-disulfonic acid. | β-Chloropropionyl | Cr | 1 | Blue (c). |
|  |  |  |  | Co | 2 | Reddish blue (c). |
| 66 | 2-amino-1-hydroxy-4-ethylsulfonylbenzene. | ...do... | ...do... | Cr | 1 | Blue (w). |
| 67 | 2-amino-1-hydroxybenzene-4-sulfonic acid-(3'-hydroxy)-propylamide. | ...do... | α,β-Dichloropropionyl | Cr | 1 | Do. |
| 68 | 2-amino-1-hydroxybenzene-4-sulfonic acid-(2'-methoxy)-phenylamide. | ...do... | α-Bromacrylyl | Cr | 1 | Do. |
| 69 | 2-amino-1-hydroxy-4-ethyl-benzene. | ...do... | β-Chloropropionyl | Cr | 1 | Reddish blue (c). |
|  |  |  |  | Co | 1 | Do. |
| 70 | 2-amino-1-hydroxybenzene-4-sulfonic acid N-2'-hydroxyethyl-N-phenylamide. | ...do... | ...do... | Cr | 1 | Blue (c). |
| 71 | 2-amino-1-hydroxybenzene-4-sulfonic acid-(3'-chloro)-phenylamide. | ...do... | Chloracetyl | Cr | 1 | Blue (w). |
| 72 | 2-amino-1-hydroxy-4-nitrobenzene. | ...do... | ...do... | Cr | 1 | Greenish black (w). |

Formulae of representative dyes of the foregoing examples are as follows:

EXAMPLE 1

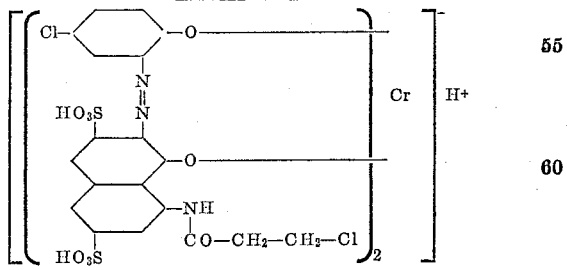

EXAMPLE 2

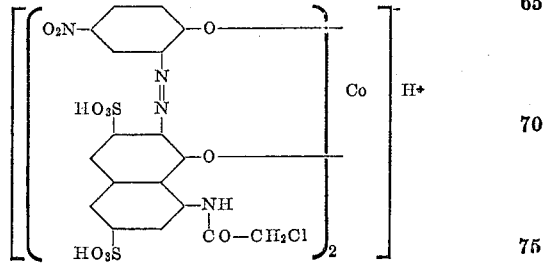

EXAMPLE 3

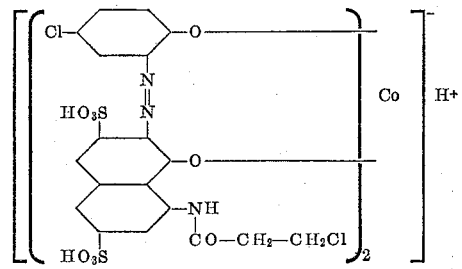

EXAMPLE 16.—FIRST DYESTUFF

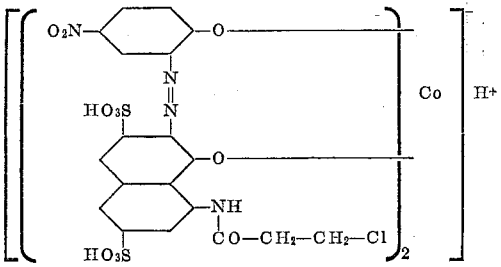

EXAMPLE 16.—SECOND DYESTUFF

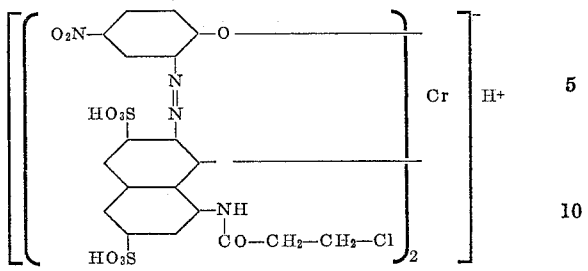

Having thus disclosed the invention what we claim is:
1. A member selected from the group consisting of the 1:2-chromium and the 1:2-cobalt complex compounds of the dyestuff of the formula

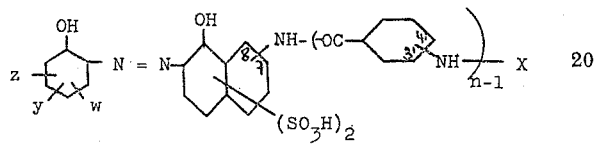

wherein
X is an acyl selected from the group consisting of halogenacetyl, β-halogenopropionyl, α,β-dihalogenopropionyl, acrylyl and α-halogenoacrylyl, halogen having an atomic number from 17 to 35, inclusive,
w is a member selected from the group consisting of hydrogen and chlorine,
y is a member selected from the group consisting of hydrogen, chlorine and nitro,
z is a member selected from the group consisting of chlorine, bromine, nitro lower alkyl, lower alkoxy, lower alkanoylamino, lower carboalkoxyamino, benzoylamino, lower alkylsulfonyl, sulfonic acid amide, sulfonic acid lower alkylamide, sulfonic acid lower hydroxyalkylamide, sulfonic acid lower alkoxyalkylamide, sulfonic acid di-(lower alkyl)-amide, sulfonic acid di-(lower hydroxyalkyl)-amide, sulfonic acid phenylamide, sulfonic acid carboxy-phenylamide, sulfonic acid sulfamylphenylamide, sulfonic acid N-lower alkyl-N-phenylamide, sulfonic acid N-lower hydroxyalkyl-N-phenylamide, sulfonic acid cyclohexylamide, sulfonic acid benzylamide, sulfonic acid lower alkylphenylamide, sulfonic acid lower alkoxyphenylamide and sulfonic acid chlorophenylamide and
n is one of the integers 1 and 2,
the group

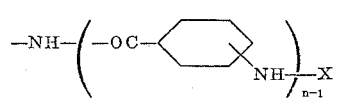

stands in one of the positions 7 and 8 of the naphthalene nucleus, and the group —NH— stands in one of the positions 3' and 4'.

2. The 1:2-chromium complex dyestuff of the formula

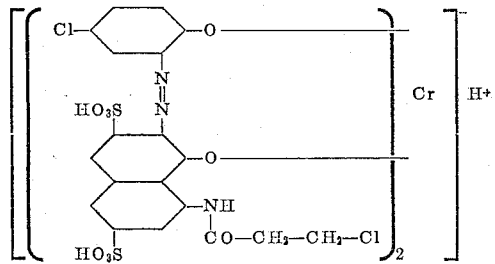

3. The 1:2-cobalt complex dyestuff of the formula

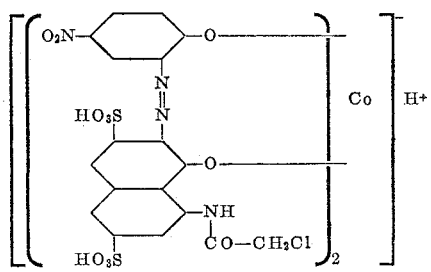

4. The 1:2-cobalt complex dyestuff of the formula

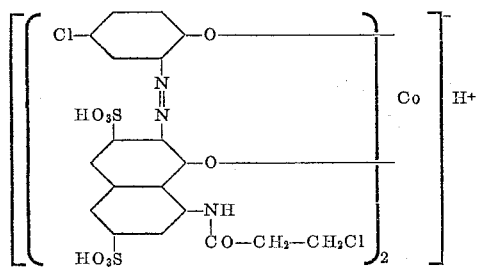

5. The 1:2-cobalt complex dyestuff of the formula

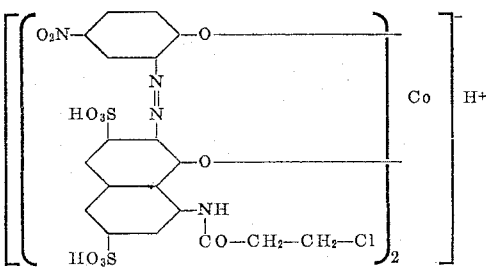

6. The 1:2-chromium complex dyestuff of the formula

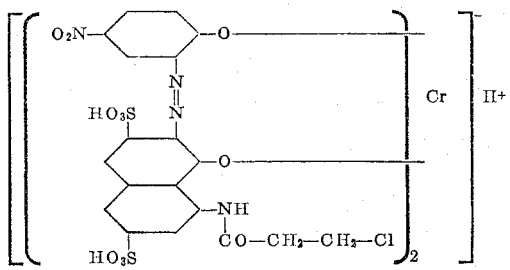

References Cited by the Examiner
UNITED STATES PATENTS
2,213,697   9/1960   Fleischhauer et al. _ 260—151 X
3,125,564   3/1964   Helsop et al. _____ 260—146 X FOREIGN PATENTS
569,115   1/1959   Belgium.
1,205,550   8/1959   France.

OTHER REFERENCES
Wegman: "Textil-Praxis," pp. 1056–1061, October 1958.

CHARLES B. PARKER, *Primary Examiner.*

REYNOLD J. FINNEGAN, DONALD M. PAPUGA,
*Examiners.*